Dec. 4, 1923.
1,476,418
E. W. RICE, JR
CONTROL SYSTEM FOR AEROPLANE SUPERCHARGERS
Filed May 31, 1919
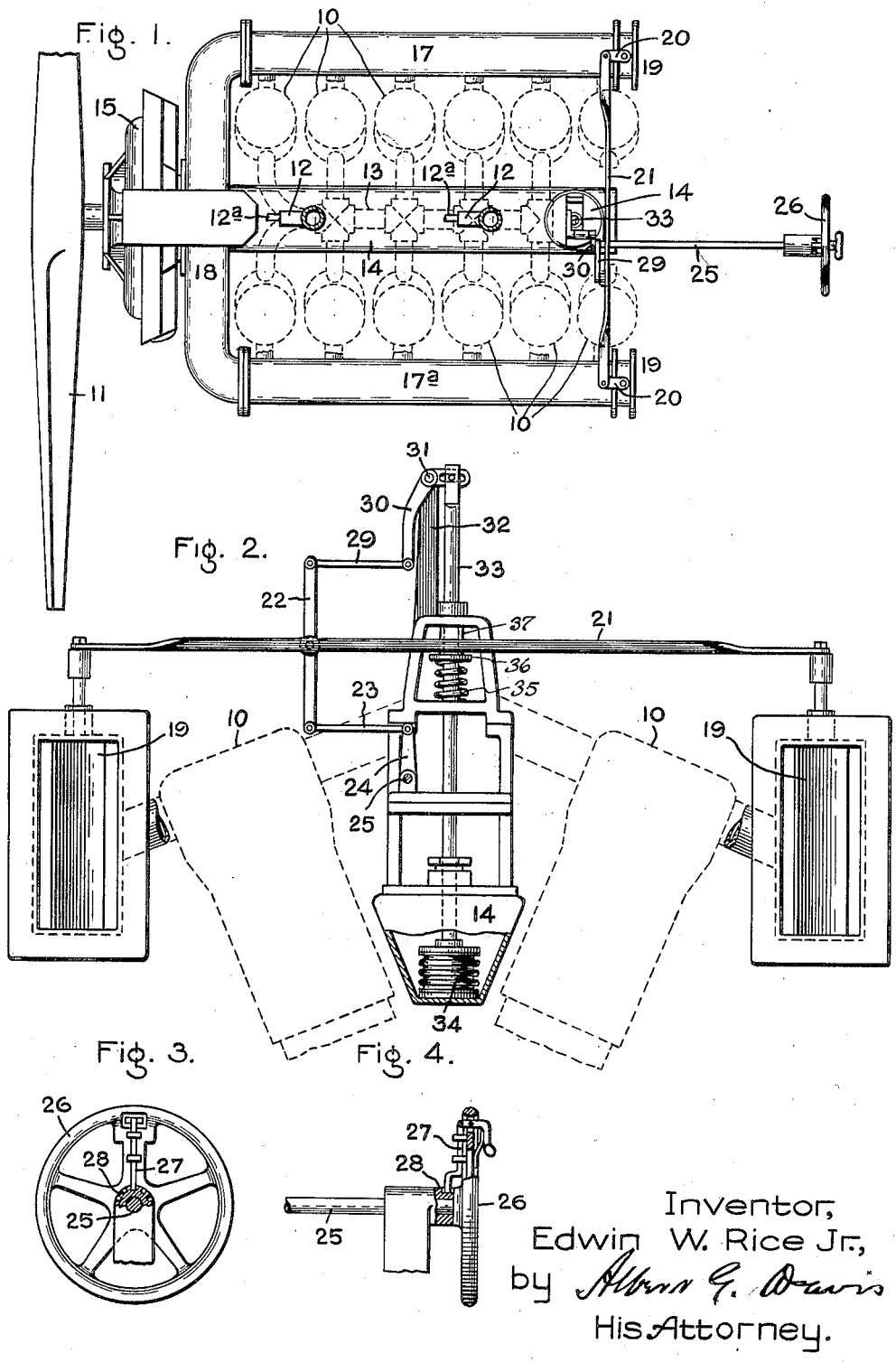
Inventor,
Edwin W. Rice Jr.,
by *Albert G. Davis*
His Attorney.

Patented Dec. 4, 1923.

1,476,418

UNITED STATES PATENT OFFICE.

EDWIN W. RICE, JR., OF SCHENECTADY, NEW YORK, ASSIGNOR TO GENERAL ELECTRIC COMPANY, A CORPORATION OF NEW YORK.

CONTROL SYSTEM FOR AEROPLANE SUPERCHARGERS.

Application filed May 31, 1919. Serial No. 301,108.

*To all whom it may concern:*

Be it known that I, EDWIN W. RICE, Jr., a citizen of the United States, residing at Schenectady, county of Schenectady, State of New York, have invented certain new and useful Improvements in Control Systems for Aeroplane Superchargers, of which the following is a specification.

The present invention relates to aeroplanes driven by internal combustion engines which are provided with a suitable means termed a supercharger for supplying compressed air to the carbureter or carbureters of the engine so that at high altitudes where the atmosphere is at a pressure lower than that at sea level the engine may be provided with air at a pressure approximating sea level pressure. By this arrangement the normal sea level horsepower of the engine may be maintained.

The power required to compress the air to the desired pressure depends, of course, on its initial pressure which varies with the altitude, and again, the degree of supercharging desirable at various altitudes and under different conditions of operation may vary. It is therefore desirable in connection with a supercharger to provide a means for regulating it, and the object of the present invention is to provide an improved means or arrangement for controlling such a regulating means for a supercharger. The regulating means for the supercharger will, of course, depend upon the specific structure of the supercharger, and while I will hereinafter describe one specific form of supercharger and regulating means therefor, it will be understood that my invention is not limited thereto.

For a consideration of what I believe to be novel and my invention, attention is directed to the following specification and the claims appended thereto.

In the drawing, Fig. 1 is a plan view of an aeroplane engine equipped with a supercharger having a control mechanism embodying my invention; Fig. 2 is an end view thereof; and Figs. 3 and 4 are detail views of an operating wheel.

Referring to the drawing, 10 indicates the cylinders of an internal combustion engine which drives an aeroplane propeller 11. It is shown as being a twelve cylinder engine provided with two carbureters 12, which are connected in parallel to the engine intake manifold 13. Fuel is supplied to the carbureters through pipes $12^a$. The air inlet conduits of carbureters 12 are connected to a supercharger air conduit 14 which is supplied with air from a suitable supercharger. In the present instance, the supercharger is shown as comprising a turbine driven centrifugal compressor 15 which is actuated by exhaust gases from the engine. The discharge opening of the compressor is connected to supercharger air conduit 14. The engine has two exhaust manifolds 17 and $17^a$ which at one end are connected together to from a gas chamber 18 which has a segment of nozzles (not shown) therein for directing gases against the buckets of the turbine wheel of the supercharger. The other ends of exhaust manifold 17 and $17^a$ are open to atmosphere, and in such ends are valves 19 which form the regulating means for the supercharger. When valves 19 are open the engine exhausts directly to atmosphere and the turbo-compressor 15 is idle. When valves 19 are closed, all the exhaust gases are directed to gas chamber 18 from whence they pass through the nozzles to operate the turbo-compressor. The compressor is then driven at maximum speed. At intermediate positions of valves 19 the exhaust gases will be partly exhausted directly to atmosphere and partly fed to the gas chamber 18 the proportions depending upon the setting of such valves. By adjusting valves 19, therefore, it will be clear that the supercharger may be regulated to deliver air at the desired pressure.

Now, according to my invention, I provide a control mechanism for the regulating means of the supercharger, i. e., for valves 19, of such character that the supercharger is normally under the direct manual control of the aviator so he can set the same to give the degree of supercharging which is deemed desirable under the existing conditions. To assist the aviator in regulating the supercharger suitable instruments such as altimeters, thermometers, etc., may be provided. I then provide in addition to the manual control, an automatic control mechanism which supplements the manual control mechanism and is so arranged or set that the degree of supercharging which the aviator can obtain by means of the manual control mechanism is limited to a predetermined value. In other words, in case the aviator tries to obtain a degree of supercharging of such a high value as would be determental to the operation of the engine, then the automatic mechanism takes control and holds the degree of supercharging within the desired maximum.

The automatic control mechanism is preferably made responsive to either the pressure or the density of the supercharged air and it may comprise a suitable pressure responsive device such as a diaphragm chamber which is subjected on its outside to the pressure of the supercharged air or to both its pressure and its temperature, the latter arrangement making the automatic control mechanism responsive to density.

In the embodiment of my invention illustrated in the drawing, valves 19 are provided with arms 20 which are connected together by a rod 21 in such a manner that when rod 21 is moved longitudinally valves 19 will be simultaneously operated in the same sense. Between the ends of rod 21 and extending crosswise of it is a floating lever 22 which is pivoted between its ends to rod 21. The lower end of lever 22 is connected by a link 23 to an arm 24 fixed on a steering rod 25. On the end of rod 25 is a steering wheel 26 provided with a suitable locking latch 27 which engages notches in a fixed segment 28. The upper end of floating lever 22 is connected by a link 29 to one arm of a bell crank lever 30 which is pivoted at its elbow at 31 on a fixed support 32 and has its other end connected to the upper end of a stem 33 carried by the free end of a sealed diaphragm chamber 34. Diaphragm chamber 34 contains a definite amount of air and is of a suitable structure to resist being collapesd by its elasticity or by the elasticity of a suitable balancing spring. In the present instance I have shown a balancing spring 35 arranged beneath a collar 36 on stem 33, a suitable stop such as a sleeve 37 being provided to limit upward movement of the spring. Diaphragm chamber 34 is located in supercharger air conduit 14 and is therefore subjected on its outside directly to the pressure of the supercharged air. It is also subjected to the temperature of the supercharged air. As the pressure of the supercharged air varies and also as its temperature varies diaphragm chamber 34 will be collapsed or permitted to expand. Stem 33 passes through a suitable stuffing box in conduit 14, and in the present instance connects directly with bell crank lever 30. It may, however, be indirectly connected to it as through a suitable servo-motor or otherwise.

In operation diaphragm chamber 34 is so adjusted and arranged that for all degrees of supercharging below a certain predetermined value the diaphragm will not be collapsed but will remain stationary. The aviator can vary the degree of supercharging by turning hand-wheel 26 which through arm 24 and link 23 moves the lower end of floating lever 22, the upper end pivoting on the end of link 29 which is now stationary. A movement of the lower end of floating lever 22 toward the left, Fig. 2, opens further valves 19 thus wasting more exhaust gases and hence slowing down the supercharger, while a movement toward the right produces the opposite result. The aviator is thus free to set valves 19 for the desired degree of supercharging. If, however, he should attempt to obtain too great a degree of supercharging, then diaphragm chamber 34 will collapse pulling down on stem 33 and turning bell crank lever 30 in a clockwise direction, as seen in Fig. 2. This through link 29 moves the upper end of floating lever 22 toward the left, thus opening further valves 19 to reduce the degree of supercharging. During such movement of the upper end of floating lever 22, the lower end pivots on link 23 which is stationary.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, an internal combustion engine, a supercharger for supplying compressed air thereto, manually operated means for controlling said supercharger, and means which operates on said manually operated means for limiting the degree of supercharging obtainable with said manually operated means.

2. In combination, an internal combustion engine, a supercharger for supplying compressed air thereto, manually operated means for controlling said supercharger, and means controlled by the pressure of the supercharged air which operates on said manually operated means for limiting the degree of supercharging obtainable with said manually operated means.

3. In combination, an internal combustion engine, carbureter means therefor, a supercharger for supplying air to said carbureter means, regulating means for said supercharger, and manually controlled means and automatically controlled means for actuating said regulating means, said automatically controlled means being set to limit the degree of supercharging obtainable with said manually controlled means.

4. In combination, an internal combustion engine, carbureter means therefor, a supercharger, a supercharger air conduit connecting the discharge side of the supercharger to the carbureter, a regulator for the supercharger, manually operated means for adjusting said regulator, and automatically operated means for adjusting said regulator to limit the amount of supercharging obtainable with said manually operated means, said automatically operated means comprising a sealed diaphragm chamber subjected on its outside to the pressure in the supercharger air conduit.

5. In combination, an internal combustion engine, carbureter means therefor, a supercharger, a supercharger air conduit connecting the discharge side of the supercharger to the carbureter, a regulator for the supercharger, manually operated means for adjusting said regulator, and automatically operated means for adjusting said regulator to limit the amount of supercharging obtainable with said manually operated means, said automatically operated means comprising a sealed diaphragm chamber located in said supercharger air conduit, whereby it is subjected on its outside to the pressure in the supercharger air conduit.

6. In combination, an internal combustion engine, carbureter means therefor, a supercharger, a supercharger air conduit connecting the discharge side of the supercharger to the carbureter means, a regulator for the supercharger, a floating lever connected at its central portion to said regulator, manually operated means connected to one end of said floating lever, and automatically operated means connected to the other end of said floating lever, said automatically operated means comprising a sealed diaphragm chamber located in said supercharger air conduit.

7. In combination, an internal combustion engine, a supercharger for supplying supercharged air thereto, said supercharger comprising a centrifugal compressor and a turbine driven by exhaust gases from the engine, valve means for controlling said turbine, manually operated means connected to said valve means for regulating the same, and automatic means responsive to the pressure of the supercharged air which operates on said valve means for limiting the amount of supercharging obtainable with the manually operated means.

8. In combination an internal combustion engine, a supercharger for supplying supercharged air thereto, said supercharger comprising a centrifugal compressor and a turbine driven by exhaust gases from the engine, valve means for controlling said turbine, manually operated means for adjusting said valve means, and automatically operated means comprising a sealed diaphragm subjected on its outside to the supercharger air pressure which operates on said valve means to limit the degree of supercharging obtainable with the manually operated means.

9. The combination with an aeroplane having an internal combustion engine, a supercharger driven by exhaust gases from the engine, and a conduit for conveying supercharged air from the supercharger to the engine, of manually operated means for controlling said supercharger, and automatic means which operates on said manually operated means for limiting the degree of supercharging obtainable with said manually operated means.

10. The combination with an aeroplane having an internal combustion engine, a supercharger driven by exhaust gases from the engine, and a conduit for conveying supercharged air from the supercharger to the engine, of manually operated means for controlling said supercharger, and a sealed diaphragm located in said conduit and connected to said manually operated means for limiting the amount of supercharging obtainable with said manually operated means.

In witness whereof, I have hereunto set my hand this 28th day of May, 1919.

EDWIN W. RICE, Jr.